April 25, 1961  L. PÉRAS  2,981,392
CLUTCHES ACTUATED BY HYDRAULIC CONTROL MEANS
Filed Jan. 29, 1959  2 Sheets-Sheet 1

INVENTOR.
LUCIEN PÉRAS
BY
Stevens, Davis, Miller & Mosher
ATTORNEYS

April 25, 1961 L. PÉRAS 2,981,392
CLUTCHES ACTUATED BY HYDRAULIC CONTROL MEANS
Filed Jan. 29, 1959 2 Sheets-Sheet 2

INVENTOR.
LUCIEN PÉRAS
BY
Stevens, Davis, Miller & Mosher
ATTORNEYS

# United States Patent Office 2,981,392
Patented Apr. 25, 1961

2,981,392
CLUTCHES ACTUATED BY HYDRAULIC CONTROL MEANS

Lucien Péras, Billancourt, France, assignor to Regie Nationale des Usines Renault, Billancourt, France, a French works Filed Jan. 29, 1959, Ser. No. 789,955
Claims priority, application France Feb. 18, 1958
3 Claims. (Cl. 192—106)

The present invention relates in general to clutches actuated by hydraulic control means and has specific reference to clutches of the type wherein the control fluid acts within a capacity or chamber rotating bodily with one of the clutch elements in order to prevent the axial effort for connecting or disconnecting the clutch from being transmitted through the axial ball or graphite thrust bearings or like member.

One of the drawbacks characterizing clutches of this known type is that when the density of the fluid used therein is relatively high and when the connection between the sourse of fluid under pressure and the rotating capacity or chamber as defined hereinabove passes close to or is coincident with the centre of this capacity (which constitutes a constructionally advantageous solution) the discharge of the clutch-operating fluid to the outside from this chamber for disengaging the clutch is counteracted by the centrifugal force developing in this chamber due to its rotation.

A known method of avoiding this drawback consists in causing relatively strong springs to act upon the fluid-responsive element, these springs being capable of causing the fluid to be discharged from the chamber when the latter is connected to the exhaust and rotates at its maximum operating speed. Nevertheless, this arrangement is inconvenient because it reduces the torque capacity of the clutch at low rotational speeds. As a matter of fact, a certain fraction of the active fluid pressure is absorbed for overcoming the spring pressure in the clutch-engaging direction, without any appreciable compensation at low rotational speeds, due to the moderate centrifugal force exerted in this case in the aforesaid chamber.

Now it is the essential object of the present invention to eliminate the drawback set forth hereinabove by incorporating in hydraulic fluid-controlled clutches of this type centrifugal inertia weights adapted to apply an antagonistic effort on the clutch element or plate responsive to the fluid pressure, in order to compensate the action of the centrifugal force on the rotary mass of control fluid which might interfere notably with the clutch release, so that the static pressure of the control fluid remains available for controlling the useful clutch engagement irrespective of the engine speed. Thus, the aforesaid drawback of a reduction in the torque capacity of the clutch at low rotational velocities is definitely avoided.

To this end, the centrifugal inertia weights may even exert a preponderant antagonistic effort in relation to that exerted by the centrifugal force on the control fluid, so that, as will be explained presently, the trend of the characteristic curve of the torque thus transmitted may be varied without inasmuch reducing this torque at low rotational speeds, this constituting a highly desirable feature.

In order to afford a clearer understanding of this invention and of the manner in which the same may be carried out in the practice, reference will now be made to the accompanying drawings forming part of this specification and illustrating diagrammatically by way of example a typical form of embodiment of the invention. In the drawings.

Figure 1:
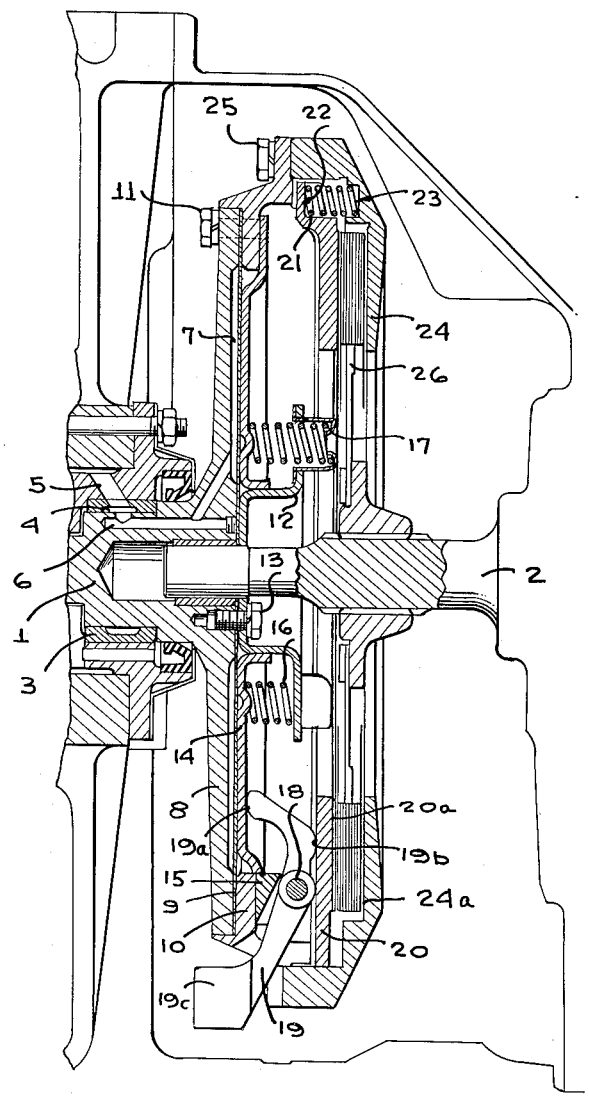
Figure 1 is an axial longitudinal section of a clutch constructed in accordance with the teachings of this invention.

In the specific form of embodiment illustrated in Fig. 1, a hydraulic fluid-actuated clutch, of known construction, is adapted to either permit the transmission of a torque from an input shaft 1 to an output shaft 2, or, on the contrary, disconnect these two shafts completely from each other.

The shaft 1 is carried by a fixed bearing 3 formed with an inner annular groove 4 connected to a passage 5 connected in turn to a clutch control valve (not shown) adapted to connect this passage 5 either with a source of fluid under pressure or with a recovery reservoir (not shown). This valve distributes the fluid by means of an adequate external control member (not shown).

On the other hand, the annular inner groove 4 is connected internally to the shaft 1 and through a longitudinal duct 6 to a sealed or fluid-tight capacity or chamber 7.

This chamber 7 is formed between the plate 8, constituting the extension of shaft 1, and a resilient deformable diaphragm 9. The fluid-tightness of this chamber 7 is ensured by clamping the diaphragm 9 on the plate 8 by means of an external ring 10 secured by screws 11, and of an internal ring 12 secured by screws 13, as shown.

A clutch plate 14 is carried along for rotation by the external ring 10 (or, in other words, by the shaft 1) through the medium of notches surrounding lever supports 15 rigid with the ring 10. This plate is displaceable in the axial direction by sliding on the inner ring 12, but is normally urged against the diaphragm 9 by springs 16 bearing with their opposite ends against spring caps 17 carried by the ring 12.

The lever supports 15 carry pivot pins 18 on which are fulcrumed swinging levers 19 bearing on the one hand against the plate 14 with their ends 19a and on the other hand against a movable plate 20 with their heels 19b.

The movable plate 20 is rotatably driven from the ring 10, that is from shaft 1, due to a notched mounting in which it is adapted to slide axially, this movable plate being urged against the levers 19 by springs 21 bearing on the one hand in recesses 22 formed therein and on the other hand in recesses 23 formed in a ring 24 secured by screws 25 on the ring 10.

The surfaces 20a of plate 20 and 24a of ring 24 are adapted to clamp in the axial direction, in the clutch engaging position, a dry friction disk 26 connected through splines to the output shaft 2.

In the form of embodiment illustrated in Fig. 1 the improvement forming the characteristic feature of this invention consists in providing on each lever 19 an extension 19c acting as already explained as balance or inertia weights, a description of the operation of this device in comparison with a conventional clutch being given hereafter.

In fact, when by actuating a suitable control device an external source of fluid under pressure is connected to the chamber 7, this fluid causes an axial deformation of the diaphragm 9 so that the latter will push the end 19a of levers 19 to the right and these levers, by bearing on the pivot pins 18, will also push through their heels 19b the plate 20 in the same direction.

The advantage arising from the provision of these intermediate levers 19 between the diaphragm 9 and the plate 20 is well known; in fact, it permits a multiplication of the effort transmitted by the diaphragm to the movable plate 20.

This movement of the plate 20 to the right causes the friction disk 26 to be clamped between the faces 20a and 24a, the torque transmitted by the clutch depending on the pressure obtained in the chamber 7.

The disengagement of the disk 26 is obtained when, by actuating the aforesaid external control member, the chamber 7 is connected to the recovery reservoir (not shown), the clutch disengagement resulting from the combined action of springs 21 and 16 tending to force the fluid out from chamber 7.

Figure 2:
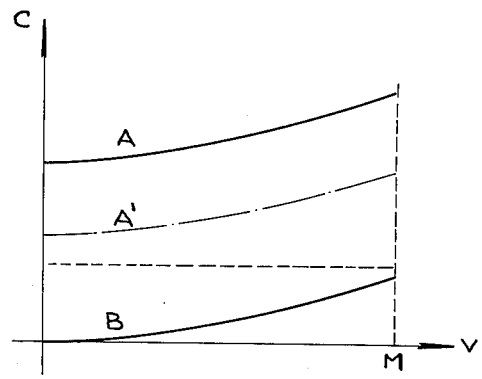
Figure 2 is a diagram giving the characteristics of a conventional clutch with hydraulic control action, wherein the velocity V of the clutch input is plotted in abscissa against the ordinates representing the transmitted torque C.

The main characteristics of a clutch not provided with balance weights 19c on the levers 19 are summarized in the diagram of Fig. 2.

In this diagram the curve A designates the torque transmitted by the clutch when the pressure of the fluid fed to the capacity 7 is constant while disregarding temporarily the antagonistic action of springs 16 and 21.

The torque increases as a function of the clutch speed, for the centrifugal force developed within the rotating mass of fluid adds itself to the static feed pressure.

B is the curve representing the torque transmitted by the clutch when the relative feed pressure is zero, that is, when the chamber 7 is connected again with the recovery reservoir.

From this figure, it is clear that if it is contemplated to disengage the disk of a clutch of this type at the maximum rotational speed M, the clutch springs must have such a value that they correspond to the transmission of a torque $C^1$ higher than the maximum torque transmissible through the clutch when the fluid feed is discontinued.

By subtracting the action of the clutch release spring from the useful clutch-engaging action resulting from the fluid pressure, the resulting curve indicates the torque transmitted, such as A', which increases with the velocity of shaft 1.

The advantage resulting from the provision of the additional inertia weights 19c is that they eliminate the detrimental portion of the extra torque which results from the influence of the centrifugal force, thus avoiding the reduction in the clutch torque capacity at low rotational speeds which was evidenced in Fig. 2. As a matter of fact, these inertia weights are so placed that the centrifugal force acting thereon is transmitted through the levers 19 to plate 14 in the direction opposite to that of the action exerted by the fluid pressure on the diaphragm 9.

Figure 3:
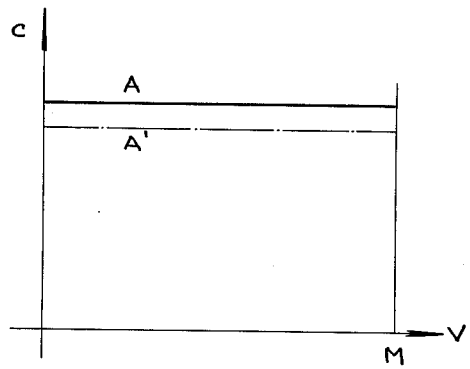
Figures 3 and 4 are other diagrams showing for the sake of comparison the characteristics of clutches constructed according to this invention.

Figure 3 shows the main characteristics of a clutch constructed according to this invention, wherein the additional inertia weights provide an exact balance of the centrifugal action in the control fluid chamber.

The curves A, A' show clearly that in a clutch of this type the torque transmitted is constant as a function of the rotational speed, the force of the clutch springs 16, 21 being calculated with a view to ensure only a correct clutch disengagement, for example when the vehicle is not running, this force being weaker than in the preceding case.

Figure 4:
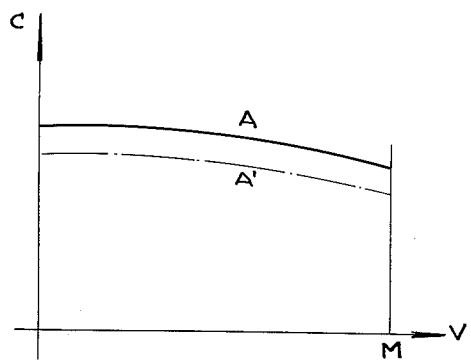

Figure 4 illustrates the torque capacity curves A, A' of a clutch constructed in accordance with the principle of this invention and wherein the antagonistic force provided by the inertia weights is intentionally calculated to be greater than that due to the centrifugal force in the fluid mass.

As in the preceding case, the clutch-release spring force may be relatively low, whereas the clutch disengagement at high rotational speeds is even facilitated by the action of the additional inertia weights.

The characteristic of the torque transmitted as a function of speed is decreasing, and in certain applications this may constitute an advantageous feature.

For example, if we consider the case of a clutch of this type mounted at the output end of a torque converter, the characteristic of the torque transmitted by the clutch is well adapted to the output torque characteristic of the converter, since it is known that the output torque of a converter decreases as a function of speed.

Of course, it will be readily understood by anybody conversant with the art that this invention is concerned generally with the use of inertia or balance weights for the purposes set forth hereinabove and not only in the specific form of embodiment described hereinabove but also in all clutches of the hydraulic-control type, wherein, for example, the deformable diaphragm of the fluid chamber may be replaced by a piston of the sliding seal or packing type.

I claim:

1. A hydraulic-control clutch comprising an input shaft, an output shaft coaxially mounted with respect to said input shaft, an end plate fixed to said input shaft, a fluid chamber provided on said end plate and having a resilient deformable diaphragm forming the end closure thereof, a clutch plate coupled to said end plate for rotation therewith and disposed adjacent said diaphragm, first spring means biasing said clutch plate against said diaphragm, a plurality of lever support means fixed to said end plate, a fulcrumed swinging lever pivotally mounted on each of said lever support means, said lever having a lever end bearing against said clutch plate and an adjacent integral lever heel, a movable plate rotatably driven from said end plate and contacted by said lever heel, second spring means operatively coupled to said movable plate to urge it against said lever heel, a ring connected to said end plate and axially spaced from said movable plate, whereby said movable plate is adapted to axially move toward said ring against said second spring means in a clutch engaging position, a dry friction disk connected to said output shaft and located between said movable plate and said ring adapted to be clamped therebetween, each of said levers having an integral inertia weight extension at the opposite end from said lever end and lever heel.

2. A hydraulic-control clutch according to claim 1, characterized in that said fluid chamber is operatively coupled to a source of fluid under pressure, control means to control the fluid flow from said source to said fluid chamber, to thereby allow fluid into said fluid chamber to cause an axial deformation of said diaphragm to push said lever end and pivot said lever on said lever support means, to thereby push through said lever heels said movable plate in the same direction of the axial deformation of said diaphragm, so that said friction disk is clamped between said movable plate and said ring to transmit torque to said output shaft, and said inertia weight extensions on each of said levers adapted to transmit centrifugal force acting thereon to said clutch plate in the direction opposite to that of the action exerted by the fluid pressure on said diaphragm to compensate for the action of the centrifugal force on the rotary mass of control fluid within said fluid chamber.

3. A hydraulic-control clutch comprising an input shaft, an output shaft coaxially mounted with respect to said input shaft, an end plate fixed to said input shaft, a fluid chamber provided on said end plate, a clutch plate axially movable on the fluid chamber and coupled to said end plate for rotation therewith, first spring means biasing said clutch plate in opposition to the action of the control fluid in the fluid chamber, a plurality of lever support means fixed to said end plate, a fulcrummed swinging lever pivotally mounted on each of said lever support means, said lever having a lever end bearing against said clutch plate and an adjacent integral lever heel, a movable plate rotatably driven from said end plate and contacted by said lever heel, second spring means operatively coupled to said movable plate to urge it against said lever heel, a ring connected to said end plate and axially spaced from said movable plate, whereby said movable plate is adapted to axially move toward said ring against said second spring means in a clutch engaging position, a dry friction disc connected to said output shaft and located between said movable plate and said ring adapted to be clamped therebetween, each of said levers having an integral inertia weight extension at the opposite end from said lever end and lever heel.

References Cited in the file of this patent

UNITED STATES PATENTS

| | | |
|---|---|---|
| 1,938,914 | Kress | Dec. 12, 1933 |
| 2,446,088 | Hobbs | July 27, 1948 |
| 2,568,135 | Vincent | Sept. 18, 1951 |
| 2,636,585 | Livermore | Apr. 28, 1953 |
| 2,853,167 | Kelley | Sept. 23, 1958 |